US009251628B2

(12) United States Patent
Ubik et al.

(10) Patent No.: US 9,251,628 B2
(45) Date of Patent: Feb. 2, 2016

(54) METHOD AND APPARATUS FOR AN ONBOARD DIAGNOSTIC INTERFACE TOOL

(71) Applicant: Ford Global Technologies, LLC, Dearborn, MI (US)

(72) Inventors: Henry Thomas Ubik, Grosse Pointe Park, MI (US); Darren Peter Shelcusky, Saline, MI (US); Vijay Sankaran, Ann Arbor, MI (US); William Jude Coughlin, Harrison Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 14/021,459

(22) Filed: Sep. 9, 2013

(65) Prior Publication Data

US 2015/0073647 A1 Mar. 12, 2015

(51) Int. Cl.

*H04W 4/00* (2009.01)
*G07C 5/00* (2006.01)
*G07C 5/08* (2006.01)

(52) U.S. Cl.

CPC .............. *G07C 5/008* (2013.01); *G07C 5/0808* (2013.01)

(58) Field of Classification Search

CPC ............ H04L 67/12; G07C 5/008; G06F 7/00
See application file for complete search history.

(56) References Cited

U.S. PATENT DOCUMENTS 5,797,134 A 8/1998 McMillan et al.
6,064,970 A 5/2000 McMillan et al.
7,124,088 B2 10/2006 Bauer et al.
7,877,269 B2 1/2011 Bauer et al.
8,311,858 B2 11/2012 Everett et al.
8,612,086 B2 * 12/2013 Jardine ................ H01R 13/665 701/29.1
8,903,597 B2 * 12/2014 Jones ...................... B60R 16/02 701/31.4
2002/0116228 A1 8/2002 Bauer et al.
2002/0128882 A1 9/2002 Nakagawa et al.
2002/0188479 A1 12/2002 Renwick et al.
2004/0153362 A1 8/2004 Bauer et al.

(Continued)

FOREIGN PATENT DOCUMENTS

CN 102407826 4/2012
CN 102407826 A 4/2012

(Continued)

OTHER PUBLICATIONS

GM Service and Parts Operations, MDI User's guide, 2008, www.OEMTools.com, pp. i-vi and 1-17.*

(Continued)

*Primary Examiner* — Thomas G Black
*Assistant Examiner* — Ana Thomas
(74) *Attorney, Agent, or Firm* — Jennifer M. Stec; Brooks Kushman P.C.

(57) ABSTRACT

An apparatus includes a processor and a plurality of on-board diagnostic (OBD) interfaces, in communication with the processor. The exemplary apparatus also includes a configurable housing, adapted to flexibly present an orientation of an OBD interface. The apparatus further includes persistent and non-persistent memory, in communication with the processor and a non-OBD I/O interface, in communication with the processor. The processor is configured to detect external device communication through a first OBD interface and function as a pass-through to a second OBD interface.

20 Claims, 4 Drawing Sheets

(56) References Cited

U.S. PATENT DOCUMENTS

| | | | | |
|---|---|---|---|---|
| 2007/0038488 | A1 | 2/2007 | Bauer et al. | |
| 2007/0046531 | A1 | 3/2007 | Yu | |
| 2011/0143785 | A1 | 6/2011 | Cohen et al. | |
| 2011/0313593 | A1 | 12/2011 | Cohen et al. | |
| 2012/0046826 | A1 * | 2/2012 | Panko .................. | G07C 5/0808 701/33.3 |
| 2012/0158211 | A1 | 6/2012 | Chen et al. | |
| 2012/0203441 | A1 | 8/2012 | Higgins et al. | |
| 2012/0245786 | A1 * | 9/2012 | Fedorchuk .............. | H04L 69/18 701/29.1 |
| 2013/0194087 | A1 | 8/2013 | Tomer | |
| 2013/0226369 | A1 | 8/2013 | Yorio et al. | |

FOREIGN PATENT DOCUMENTS

| | | | |
|---|---|---|---|
| CN | 202600155 | | 12/2012 |
| EP | 0700009 | A2 | 3/1996 |
| EP | 2852937 | A1 | 4/2015 |
| JP | 2002259708 | A | 9/2002 |
| WO | 2005083605 | A1 | 9/2005 |
| WO | 2009117571 | | 9/2009 |

OTHER PUBLICATIONS

GM Service and Parts Operations, MDI User's guide, 2008, www.OEMTools.com.*

Search Report for GB 1318281.1, Completed by the Great Britain Patent Office, Dated Mar. 28, 2014, 4 Pages.

Website http://www.mightygps.com/carchargergpsreceiver.htm "Cigarette lighter powered GPS" Dated Dec. 6, 2008, Retrieved from the Wayback Machine on Oct. 14, 2014, 3 Pages.

Website http://www.peakmiles.com/how-it-works/how-does-peak-mileage-capture-work/ "How does PEAK Mileage Capture Work" Dated Aug. 26, 2013, Retrieved from the Wayback Machine on Oct. 14, 2014, 1 Page.

www.autotestaid.com.

http://www.verizonwireless.com/wcms/consumer/devices/vehicle-diagnostics.html.

http://www.xirgotech.com/products-page.

http://www.progressive.com/auto/snapshot-how-it-works.

Intellectual Property Office, Examination Report for the corresponding Patent Application No. GB1318281.1 mailed Sep. 18, 2015.

* cited by examiner

METHOD AND APPARATUS FOR AN ONBOARD DIAGNOSTIC INTERFACE TOOL

TECHNICAL FIELD

The illustrative embodiments generally relate to a method and apparatus for an onboard diagnostic interface tool.

BACKGROUND

Onboard Diagnostics (OBD, OBD II, OBD 2) provide an interface whereby entities, such as dealers, mechanics and third parties (such as insurance companies) can plug into a vehicle to access information on a vehicle BUS or from vehicle modules. Because of the use of the port by consumers, installing third party devices, for example, delicate pins included in the port can often be damaged. This creates warranty alerts then for the vehicle, and can be costly to repair, since a broken port will not allow the dealer to access the diagnostics.

Additionally, as the port provides a physical interface that can access the vehicle's CAN BUS(es), there may be other hardware and software that would like to pull information from this BUS. If all these resources were to try to access the current implementations of the OBD II port, additional opportunity for damaging the integrated port would occur.

U.S. Patent Application 2012/0158211 generally relates to continuously collecting information from vehicle devices via a vehicle data bus, storing information in a database, and retrieving information from the database in response to requests from remote devices. One embodiment includes a vehicle position determining device, a wireless communications device, and a controller apart from at least one operable vehicle device, connected to the vehicle data bus so that the vehicle data bus extends from said controller to at least one operable vehicle device. Additionally, the controller is configured to query at least one vehicle device via the vehicle data bus and store information provided by at least one vehicle device in a database, receive requests for information from a remote device via the wireless communications device, query the database for the requested information, and send the requested information to the remote device via the wireless communications device.

SUMMARY

In a first illustrative embodiment, an apparatus includes a processor and a plurality of on-board diagnostic (OBD) interfaces, in communication with the processor. The exemplary apparatus also includes a configurable housing, adapted to flexibly present an orientation of an OBD interface. The apparatus further includes persistent and non-persistent memory, in communication with the processor and a non-OBD I/O interface, in communication with the processor. The processor is configured to detect external device communication through a first OBD interface and function as a pass-through to a second OBD interface.

In a second illustrative embodiment, a computer-implemented method includes detecting connection of an external device to a first OBD port provided to a dongle. The method also includes detecting connection of the dongle to a vehicle-OBD port through a second OBD port provided to the dongle. The method further includes evaluating, via a dongle-processor, whether pass-through capability is desired and providing pass-through capability between the external device and the vehicle-OBD port through the dongle when pass-through capability is desired.

In a third illustrative embodiment, a non-transitory computer readable storage medium stores instructions that, when executed by a processor, cause the processor to perform a method including detecting connection of an external device to a first OBD port provided to a dongle. The method also includes detecting connection of the dongle to a vehicle-OBD port through a second OBD port provided to the dongle. The method further includes evaluating, via a dongle-processor, whether pass-through capability is desired and providing pass-through capability between the external device and the vehicle-OBD port through the dongle when pass-through capability is desired.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
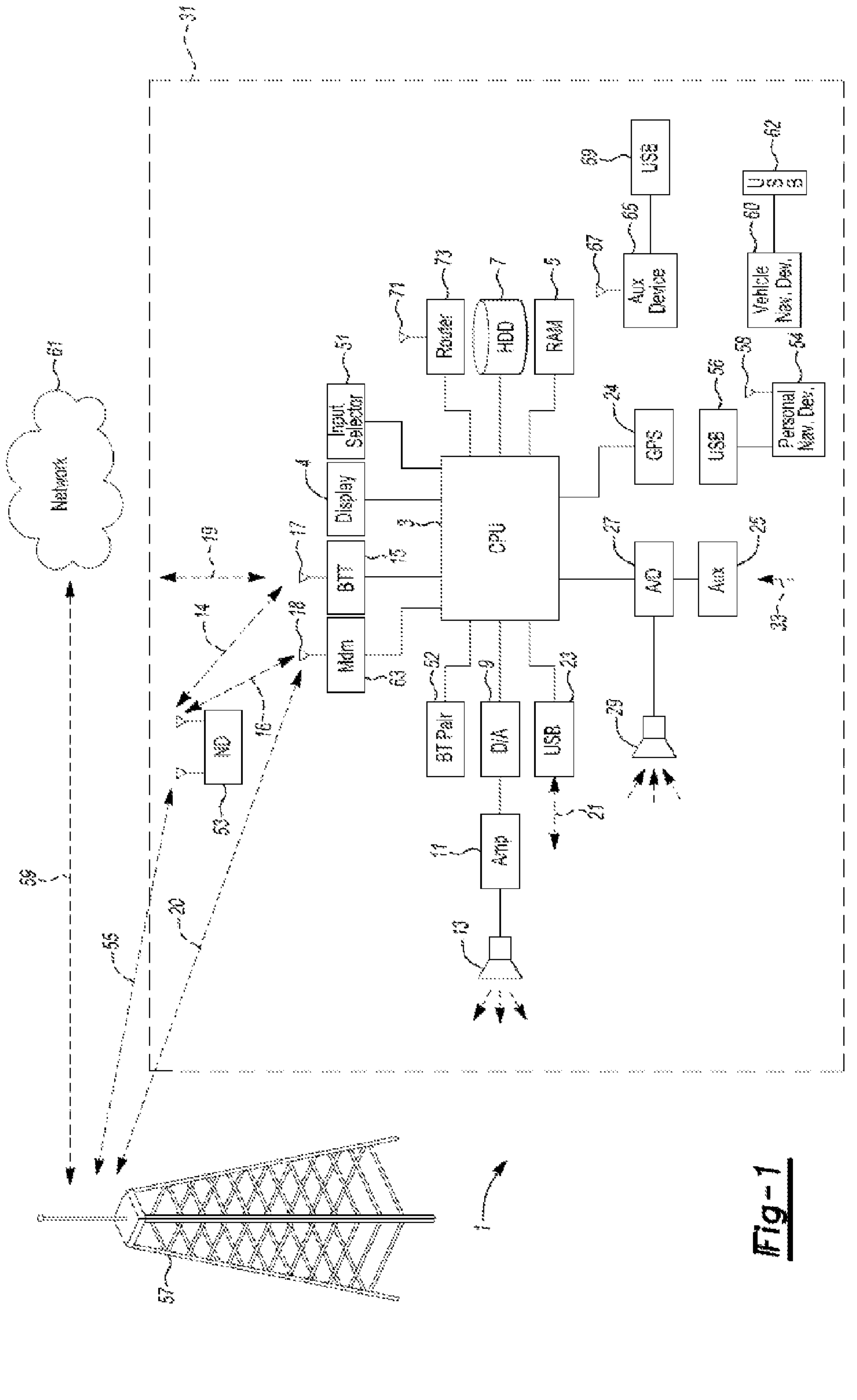
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In order to provide a wider range of capabilities to and OBD II port, and to assist in preventing accidental damage to the OBD II port, an OBD dongle is contemplated. This dongle can provide a variety of secondary interfaces, including, but not limited to, wireless access, USB access, RJ45 access, direct remote access, OBD II access, etc.

Figure 2A:
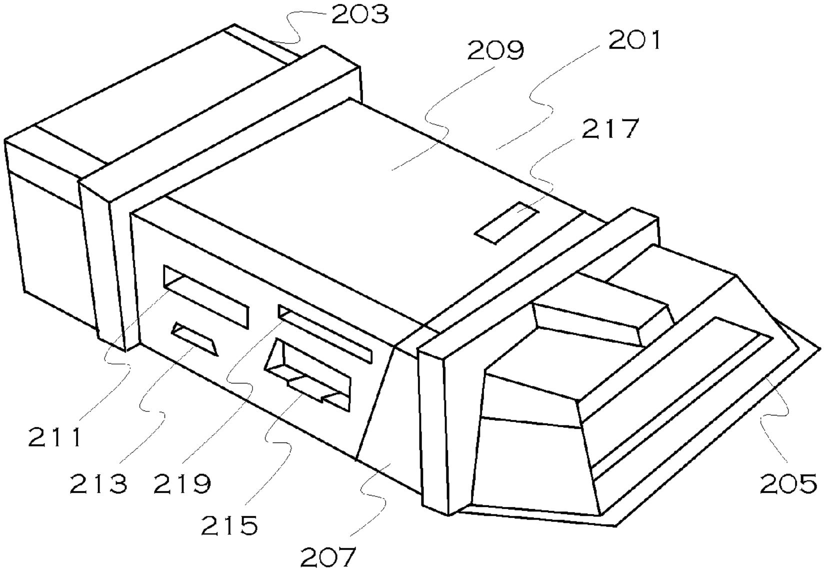
FIG. 2A shows an illustrative example of an OBD dongle.

FIG. 2A shows an illustrative example of an OBD II dongle. In this illustrative example, the dongle provides a number of exemplary physical interfaces with the OBD II port. While a number of interfaces are shown, they are exemplary in nature and are not intended to limit the scope of the invention in any manner. Additionally, not all the interfaces shown need be present in a single device. While multiple interfaces may be present, it is also possible to build more specialized devices that include interfaces for specific usages, and that may lack other interfaces that are not needed for the implementation.

In this example, a connector 203 provided to the dongle 201 plugs into the vehicle OBD II port (not shown). Once engaged, this dongle can be left attached if desired, providing secondary access to the port through the dongle interfaces, while protecting the integrated port from damage by a user.

The dongle itself, in this example, includes a number of secondary interfaces. These include, but are not limited to, a USB port 211, a micro USB port 213, an SD card slot 219 and an RJ 45 connector. Each of these interfaces provides a point of connection for external devices, so that through these interfaces the OBD dongle can support a variety of secondary connections.

In addition, a number of internal capabilities may be included in the OBD dongle casing 209. This can include internal processing capability (for device handling and to handle programs and applications installed on the dongle) and the inclusion of one or more wireless protocols and transceivers. A status light 217 can show the connected/disconnected status of any engaged wireless connection.

Additionally, the OBD dongle has an OBD port of its own 205, which can receive a traditional OBD connection device. This can allow a dealer to hook up a diagnostic tool, or any other third party OBD device to be engaged. In this example, the OBD dongle also has some physical configurability, as the port is hinged 207 or provided with some other flexible joint (accordion joint, etc.) to allow the driver to position any connected OBD device so as not to interfere with the drivers legs/feet. Any suitable manner of creating some configurable flexibility may be implemented.

Figure 2B:
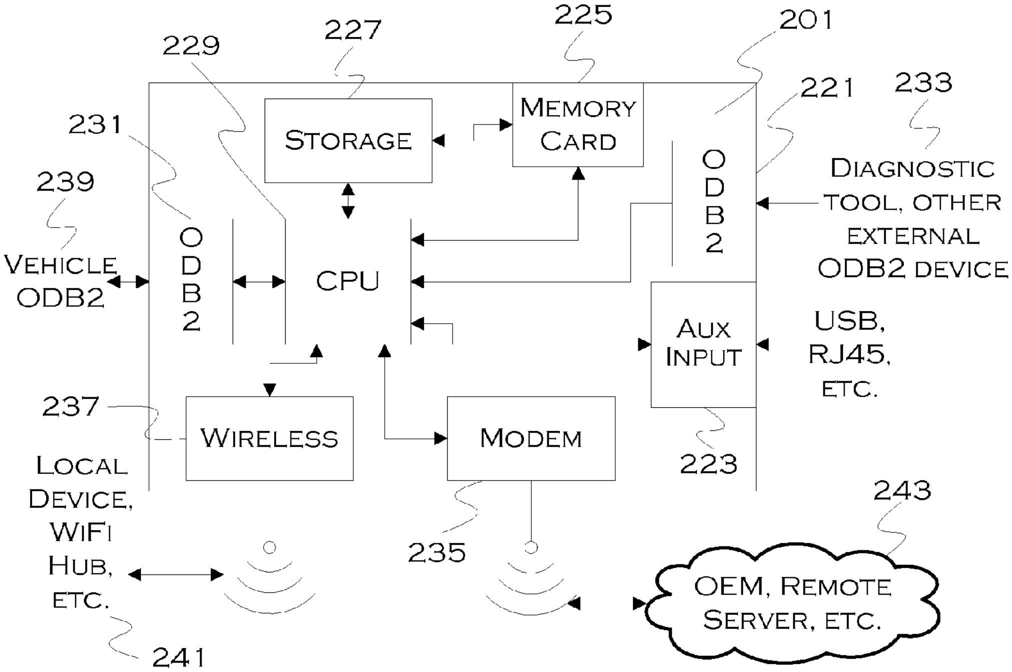
FIG. 2B shows an illustrative example of an OBD dongle component diagram.

FIG. 2B shows an illustrative example of an OBD dongle component diagram. In this illustrative example, most of the functionality of the OBD dongle is routed through an internal CPU 229. This CPU provides for processing of connections, processing of onboard software, and remote communication with wireless devices and remote servers seeking to access the port or information obtainable therethrough.

The CPU has an internal storage device 227 provided to it in this example, which can also be supplemented by a memory card 225 to upgrade the storage size. The memory card can come pre-loaded with programs for the OBD CPU to process as well, if desired. Further, the memory card slot (such as an SD card slot) can be used with an external modem that can plug into such a slot, providing external modem capability to the OBD dongle and providing modular capability for the dongle (e.g., the device can be added as needed).

In this example, an internal modem is provided 235 in lieu of the external modem. Regardless of the choice of modems, the modems can be used by an OEM, for example, to access the dongle and obtain diagnostic information. OBD codes, which may be too complex for the CPU to handle at the speed they are received, can be uploaded to a cloud-site 243 through the modem as well, where more powerful processing can be engaged to handle and interpret the codes and messages.

The dongle also has a wireless link 237 provided thereto, which can provide BLUETOOTH, WiFi and other wireless capability. This can be used to connect to a local wireless device 241 that is located in or near the vehicle, such as, but not limited to, a driver's phone.

One or more auxiliary inputs 223 can also be provided. These inputs can include, but are not limited to, RJ45, USB, SD cards, micro USB or any other suitable physical connection. The other physical port that will typically be included in the device is the external OBD2 connector 221. This can allow a dealer diagnostic tool, a 3$^{rd}$ party OBD device, or any other suitable OBD device 233 to be connected to the vehicle OBD port. The dongle itself connects to the vehicle OBD port 239 through an OBD connector 231 provided to the dongle for such a connection.

In certain situations, OBD connected devices that interface with the dongle desire a direct connection to the OBD port. For example, if a dealer connects a diagnostic tool, the tool will typically want to directly access the OBD port and pull diagnostic codes from a vehicle BUS. In order to facilitate this action, and not to interfere, the CPU, which, in this example, is in communication with the various input ports, can cause the device to act as a pass-through when an appropriate external (OBD or otherwise) device is connected. Then, the dongle is essentially functioning as an extension of the OBD port and should not interfere with the functionality of the connected device.

In other instances, such as, for example, when a 3$^{rd}$ party desires to connect a device, the CPU can potentially function in place of that device. It has become reasonably commonplace for insurance companies to offer devices that can be connected to OBD ports that track certain aspects of driving behavior. Information from these devices can then be used to adjust insurance rates. Instead of hooking up a separate device, the CPU/memory of the OBD dongle can offer an option to the insurance company to simply support the software that would typically be installed on the secondary device. This software can be installed on the dongle, and can report back to the insurance company as needed. Other 3$^{rd}$ party software could also be installed as desired. The CPU can also support a variety of APIs for interfacing with the vehicle, a vehicle computing system and/or the device itself, such as, but not limited to, OpenXC, J2534, AppLink or any other suitable API.

Figure 3:
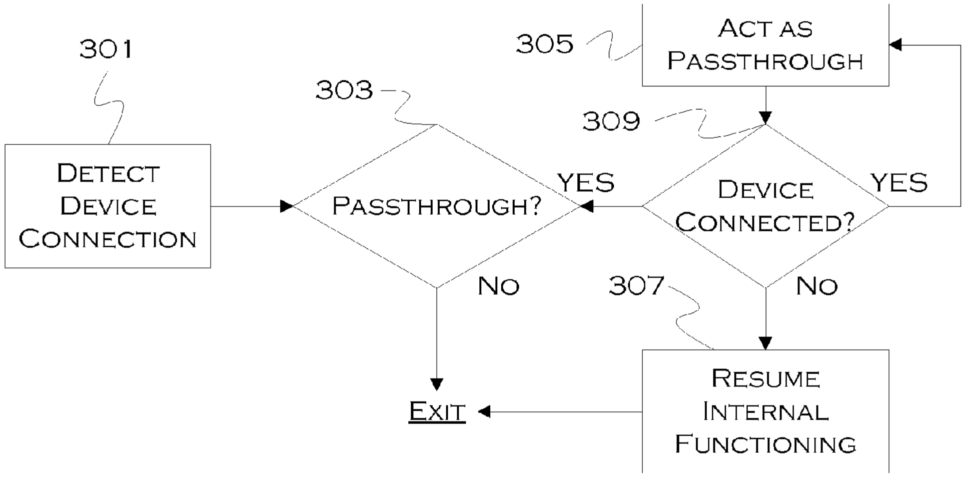
FIG. 3 shows an illustrative example of a process for device connection handling.

FIG. 3 shows an illustrative example of a process for device connection handling. In this illustrative example, a diagnostic or other external OBD device is connected to the dongle, and the dongle is intended to act as a pass-through for the OBD port. Once a device is connected to the dongle, the process will detect the connection of the device 301.

The device can then request some functionality of the CPU, or, in another example, a determination of "pass-through" device may be made based on the type of external connection (e.g., USB devices may not request pass-through, OBD devices will cause pass-through, etc.). The process determines if the dongle should function as a pass-through 303 and then ensures that device is still connected 305. As long as the external device is connected 305, the process will suppress the CPU or otherwise cause the dongle to function as a pass-through for OBD communication 309. Once the device is no longer connected (or a request to end pass-through is sent, for example), the dongle will cease to function as a pass-through and resume "standard" functionality 307. While the dongle is in pass-through mode, the processor can enter a "sleep" state, which will terminate upon removal of, or request from, the external device.

Figure 4:
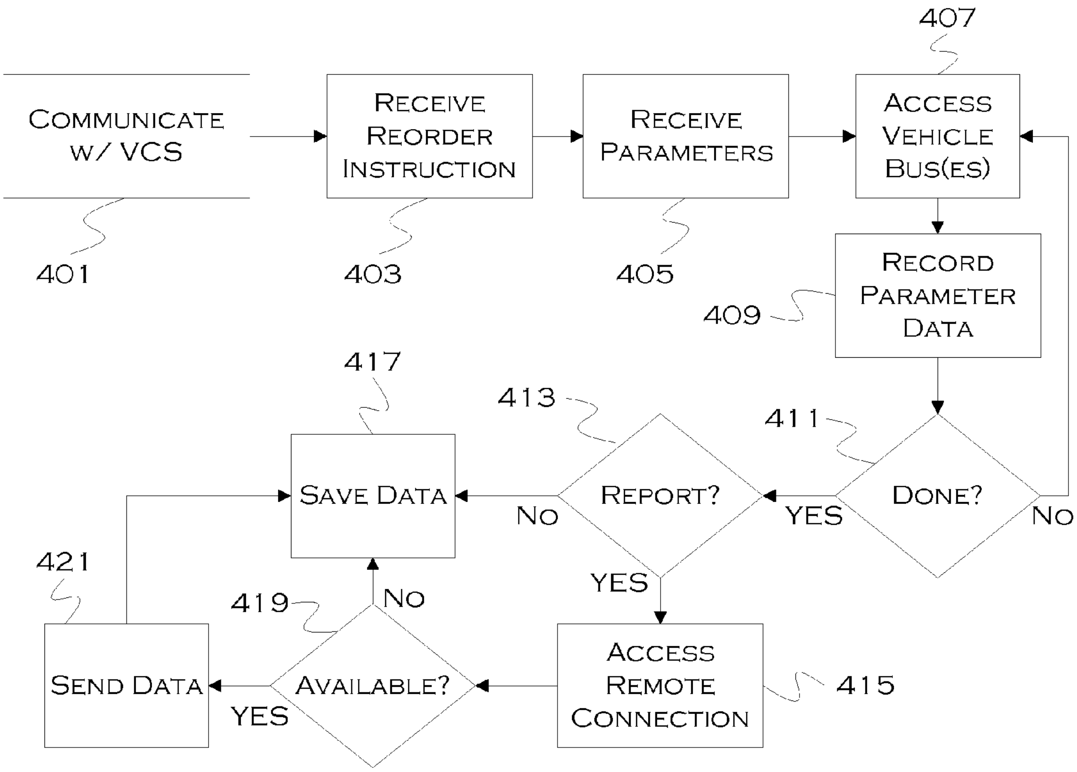
FIG. 4 shows an illustrative example of a process for information recording.

FIG. 4 shows an illustrative example of a process for information recording. In this illustrative example, a "flight recorder" function will be enabled that allows recording of data from the vehicle bus and vehicle modules, sensors, etc. This can be useful for insurance purposes, diagnostic purposes, OEM feedback and any other suitable vehicle-data based task. In this example, the process communicates with a vehicle computing system 401 through, for example, an API designed for such communication. In another example, the process may communicate more directly with the VCS, using integrated vehicle communication channels.

Recording is initiated by the receipt of a recording instruction 403. This may correspond to a user actively engaging the recording, or, in another example, may be triggered by the onset of some event. For example, if a user complains of a problem when a vehicle travels faster than 60 mph, and a mechanic cannot diagnose the problem, a set of instructions to record data above speeds of 60 mph may be implemented. Then, whenever the vehicle passes 60 mph, the recording will begin, and after sufficient data is gathered, the data can be transmitted or the user can return to the mechanic for evaluation of the data.

Parameters such as the speed limit, and other constraints or triggering conditions may be received by the process 405. These parameters can define when to record data, and can additionally or alternatively define which data to record. The parameters can further define reporting conditions for data, so that some or all of the recorded data can be reported immediately if possible, and/or stored for future evaluation.

Once a triggering condition, if any, has been met, the process will access one or more vehicle busses, and/or receive one or more diagnostic codes or other reporting from the OBD port to which the dongle is connected 407. Based on the parameters, suitable data can be recorded 409 until a condition for ending recording is met 411, or other suitable end parameters are met. In the case where no parameters are given, data can be recorded/reported until a certain volume of data is met, or until a certain snapshot of time has been considered, etc.

The process also checks if reporting is desired 413. If no reporting is required, the process will store the data for later consideration 417. If reporting is desired, the process attempts to establish a remote connection with a report receiving entity. This could be a user mobile phone, a remote server, or any other device capable of receiving, storing and/or analyzing the data. In this example, if the remote connection is available 419, the process will send the appropriate data 421 to the remote connection. The process will also save the data 417, so that the data can be considered by a reviewing party at a future date. If there is no connection available, the process may simply save the data and attempt to report the data at some future time when a connection becomes available.

Figure 5:
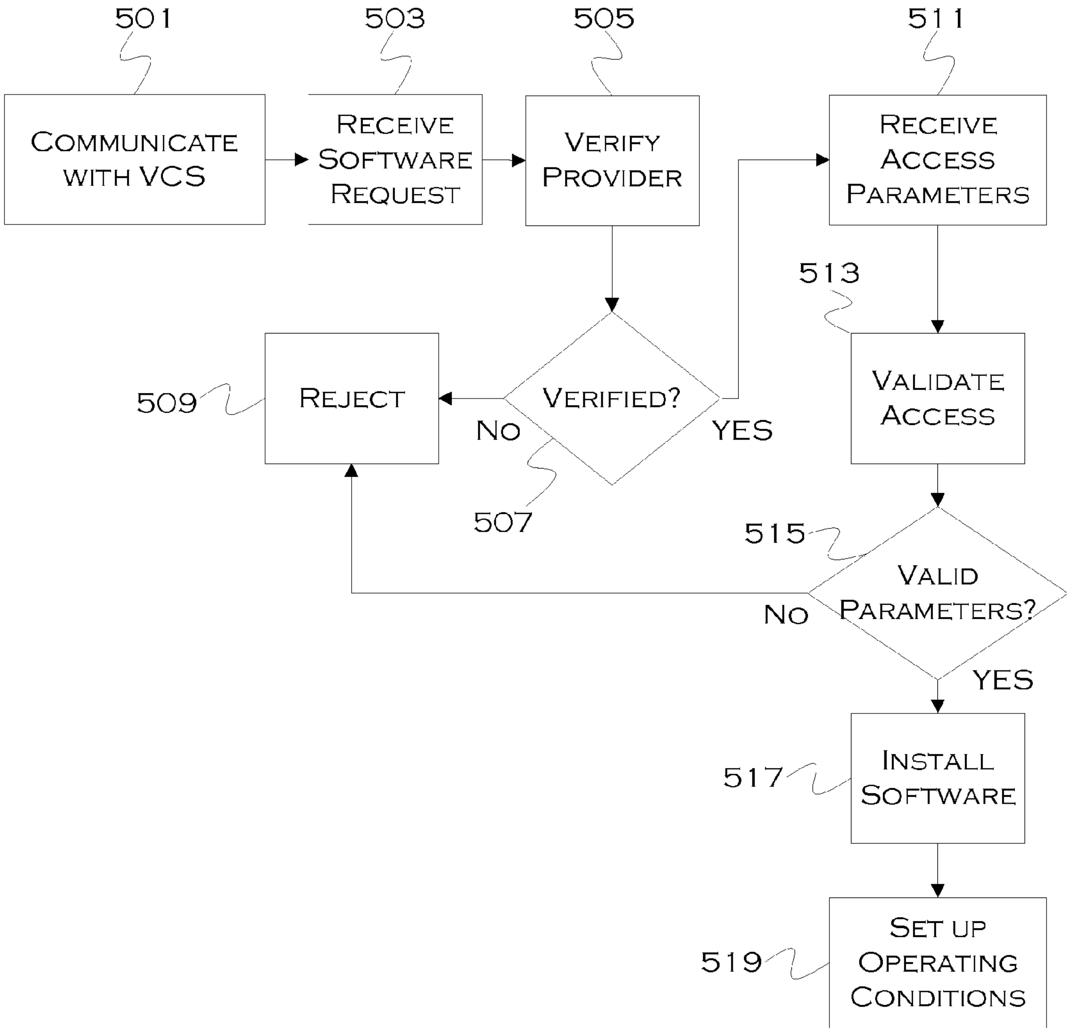
FIG. 5 shows an illustrative example of a process for secondary software installation.

FIG. 5 shows an illustrative example of a process for secondary software installation. In this illustrative example, the process again communicates with the VCS, through which a software request may be received. In one example, a user application will communicate with the VCS and a $3^{rd}$ party provider, such as an insurance company. By downloading the application to, for example, a phone, the user can then interface with the VCS and instruct installation of a dongle-based tracking application. Through this process, in communication with the VCS, the application can be installed.

In another example, the $3^{rd}$ party may be temporarily provided with direct access to the dongle for installation purposes (through the modem, for example), or the VCS may instruct the dongle to communicate directly with the $3^{rd}$ party on a temporary basis. Once a suitable communication channel has been established, the process may proceed to receive a request to install software on the dongle 503.

In order to ensure that inappropriate software is not installed, the process may first attempt to verify a provider of the software 505. In the case where the dongle "knows" who is providing the software, this can be done by verifying the sender, for example. In other cases, checksums or other suitable methods for verification may be implemented, based on pre-agreed protocols, for example.

If the provider can be verified 507, the process may also check to see what data the software desires to access 511. Since some OBD data is public, and some is manufacturer confidential, the process may seek to ensure that no inappropriate access of data is being attempted. By checking which data software will be attempting to access 511, the process can ensure that only appropriate data is being accessed.

The process will validate that the requested data is suitable for access 513. If no data parameters are provided, or if invalid parameters are provided, the process may not validate the application for installation. The process may also set permissions at this point, so that only requested data is accessible by the application, which encourages the application provider to be forthright in a permissions request.

If the access parameters are valid and permissible 515, the process will proceed to download and install the software. Any operating conditions for the software, such as when to engage the software, what data the software can access, when to report and/or store data, etc., can also be established at this time 519.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:

a first and second on-board diagnostic (OBD) interface;

a processor, configured to detect external device communication through the first OBD interface and cause the apparatus to function as a pass-through to the second OBD interface;

a configurable housing, including a flexible portion adapted to flex to change an OBD interface-orientation;

persistent and non-persistent memory, in communication with the processor; and a non-OBD I/O interface, in communication with the processor.

2. The apparatus of claim 1, wherein the non-OBD I/O interface includes a USB interface.

3. The apparatus of claim 1, wherein the non-OBD I/O interface includes an SD card slot.

4. The apparatus of claim 1, wherein the non-OBD I/O interface includes an external modem.

5. The apparatus of claim 4, wherein the external modem is installed into an SD card slot.

6. The apparatus of claim 1, wherein the non-OBD I/O interface includes an internal modem.

7. The apparatus of claim 1, wherein the non-OBD I/O interface includes an RJ45 connector.

8. The apparatus of claim 1, wherein the processor is configured to receive and interpret a signal from an external device providing the external communication, and to function as a pass-through upon request of the external device.

9. The apparatus of claim 1, wherein the processor is configured to function as a pass-through whenever an external device is connected to the first OBD interface.

10. The apparatus of claim 1, wherein the non-OBD I/O interface includes a BLUETOOTH interface.

11. The apparatus of claim 1, wherein the non-OBD I/O interface includes a WiFi interface.

12. The apparatus of claim 1, wherein the non-OBD I/O interface includes a radio frequency (RF) interface.

13. A computer-implemented method comprising:

detecting connection of an external device to a first OBD port provided to a dongle;

detecting connection of the dongle to a vehicle-OBD port through a second OBD port provided to the dongle;

evaluating, via a dongle-processor, whether pass-through capability is desired; and providing pass-through capability between the external device and the vehicle-OBD port through the dongle when pass-through capability is desired.

14. The method of claim 13, wherein the evaluating further comprises determining that pass-through capability is desired whenever the external device connection is detected.

15. The method of claim 13, wherein the evaluating further comprises determining that pass-through capability is desired whenever the external device requests pass-through capability.

16. The method of claim 13, wherein the evaluating further comprises determining that pass-through capability is desired whenever the external device is a diagnostic tool.

17. The method of claim 13, further comprising engaging a sleep mode in the dongle-processor when pass-through capability is being provided.

18. The method of claim 17, further comprising disengaging the sleep mode when the external device is removed from the first OBD port.

19. The method of claim 17, further comprising disengaging the sleep mode when the external device requests termination of pass-through capability.

20. A non-transitory computer readable storage medium, storing instructions that, when executed by a processor, cause the processor to perform a method comprising:

detecting connection of an external device to a first OBD port provided to a dongle;

detecting connection of the dongle to a vehicle-OBD port through a second OBD port provided to the dongle;

evaluating, via a dongle-processor, whether pass-through capability is desired; and providing pass-through capability between the external device and the vehicle-OBD port through the dongle when pass-through capability is desired.

* * * * *